United States Patent
Lopez Zuleta et al.

(10) Patent No.: US 11,259,120 B2
(45) Date of Patent: Feb. 22, 2022

(54) AUTONOMOUS AUDIO SYSTEM FOR SEAT HEADREST, SEAT HEADREST AND ASSOCIATED VEHICLE

(71) Applicant: Faurecia Clarion Electronics Europe, Paris (FR)

(72) Inventors: Nicolas Lopez Zuleta, Paris (FR); Mounira Rigaud-Maazaoui, Paris (FR); Jérôme Noirot, Paris (FR); Xenofon Doukopoulos, Paris (FR); Gaël Laqueille, Paris (FR); Jérémie Leclere, Paris (FR)

(73) Assignee: FAURECIA CLARION ELECTRONICS EUROPE, Paris (FR)

( * ) Notice: Subject to any disclaimer, the term of this patent is extended or adjusted under 35 U.S.C. 154(b) by 1 day.

(21) Appl. No.: 16/905,442

(22) Filed: Jun. 18, 2020

(65) Prior Publication Data
US 2020/0404422 A1    Dec. 24, 2020

(30) Foreign Application Priority Data
Jun. 19, 2019 (FR) ................. FR 19 06590

(51) Int. Cl.
*H04R 5/02* (2006.01)
*B60N 2/879* (2018.01)
(Continued)

(52) U.S. Cl.
CPC ............ *H04R 5/023* (2013.01); *B60N 2/879* (2018.02); *B60R 16/023* (2013.01); *H04S 7/305* (2013.01);
(Continued)

(58) Field of Classification Search
CPC . H04R 2499/13; H04R 5/023; B60R 11/0217; B60R 2011/0017; B60R 16/023; H04S 7/305; B60N 2/879
(Continued)

(56) References Cited

U.S. PATENT DOCUMENTS

2009/0214050 A1    8/2009  Sawashi
2009/0323983 A1    12/2009 De Muynke et al.
(Continued)

FOREIGN PATENT DOCUMENTS

| EP | 2113913 B1 | 8/2011 |
| EP | 2987341 B1 | 8/2016 |
| EP | 3094114 B1 | 5/2017 |

OTHER PUBLICATIONS

French Search Report corresponding to French Application No. FR 1906590, dated Feb. 3, 2020, 2 pages.

*Primary Examiner* — Paul Kim
(74) *Attorney, Agent, or Firm* — Reising Ethington P.C.

(57) ABSTRACT

An audio system for a headrest having a set of R right speaker(s), a set of L left speaker(s), and an electronic chain configured to emit a sound signal from at least a right input signal and a left input signal. The electronic chain includes a separating module configured to obtain, from the right input signal and the left input signal ($L_{IN}$), at least four mono audio components, and a sound spatialization module configured to apply, to each mono audio component delivered by the separating module, a binaural filter previously selected from the plurality of binaural filters, and dedicated to the audio component, producing a sound whose source position is associated with the previously selected binaural filter.

14 Claims, 3 Drawing Sheets

(51) Int. Cl.
    *B60R 16/023*    (2006.01)
    *H04S 7/00*      (2006.01)
    *B60R 11/02*     (2006.01)
    *B60R 11/00*     (2006.01)

(52) U.S. Cl.
    CPC ... *B60R 11/0217* (2013.01); *B60R 2011/0017* (2013.01); *H04R 2499/13* (2013.01)

(58) Field of Classification Search
    USPC .................................................. 381/302, 86
    See application file for complete search history.

(56) References Cited

U.S. PATENT DOCUMENTS

| | | |
|---|---|---|
| 2013/0158856 A1 | 6/2013 | Xiang |
| 2014/0355793 A1 | 12/2014 | Dublin et al. |
| 2017/0150288 A1* | 5/2017 | Dublin .................... H04S 1/007 |
| 2018/0015878 A1 | 1/2018 | Mcnew |
| 2018/0056832 A1 | 3/2018 | Oswald et al. |

* cited by examiner

AUTONOMOUS AUDIO SYSTEM FOR SEAT HEADREST, SEAT HEADREST AND ASSOCIATED VEHICLE

TECHNICAL FIELD

The present invention relates to an audio system for a seat headrest comprising a set of R right speaker(s), a set of L left speaker(s), and a control unit comprising an electronic chain configured to emit a sound signal from at least one pair of input signals comprising a right input signal and a left input signal for reproducing sounds via a pair of channels comprising a right channel and a left channel, the respective ends of which are the set of R right speaker(s) and the set of L left speaker(s), R and L being integers greater than or equal to one, each speaker being configured so as to be integrated into the headrest.

The present invention also relates to a seat headrest designed to be coupled to a backrest of a seat, the headrest being equipped with such an audio system.

The invention also relates to a passenger transport vehicle, in particular a motor vehicle, comprising one or several seats, at least one seat being equipped with such a headrest.

The invention also relates to an audio processing method, the method being implemented by such an audio system for a headrest.

The invention also relates to a computer-readable medium storing a program having software instructions which, when executed by a computer, implement such an audio processing method.

BACKGROUND

The invention relates to the field of vehicle seats provided with so-called "smart" headrests in particular incorporating speakers, called near field speakers, for broadcasting sounds near the head of the user seated on the seat. Such seats can for example be installed in car, a coach bus, an airplane, or a train.

Documents EP 2987341 B1 and EP 3094114 B1 teach an audio system of the aforementioned type. However, such audio systems for a headrest do not disclose a solution for creating private audio zones for different occupants.

Indeed, documents EP 2987341 B1 and EP 3094114 B1 relate to a method for adjusting signals in a motor vehicle audio system in particular comprising a step for filtering a multichannel signal mixed with the combination of a first and a second binaural filter, in order to generate a binaural output signal able to be emitted by the speakers in the near field.

Additionally, these documents also disclose that the method for adjusting signals comprises a step for determining a first set of weights to be applied to the signals from channels making up the mixed multichannel signal in order to define a first sound scene and a step for determining a second set of weights to be applied to the signals from channels making up the mixed multichannel signal in order to define a second sound scene stage.

SUMMARY

One aim of the present invention is to provide a solution for creating private audio zones for different occupants of a same vehicle.

To that end, the invention relates to an audio system for a seat headrest comprising a set of R right speaker(s), a set of L speaker(s), and a control unit comprising an electronic chain configured to emit a sound signal from at least one pair of input signals comprising a right input signal and a left input signal for reproducing sounds via a pair of channels comprising a right channel and a left channel, the respective ends of which are the right set of R speaker(s) and the left set of L speaker(s), R and L being integers greater than or equal to one, each speaker being configured so as to be integrated into the headrest, the electronic chain comprising:

a separating module configured to obtain, from the right input signal and the left input signal, at least four mono audio components, preferably, two left mono audio components and two right mono audio components, a sound spatialization module comprising a plurality of binaural filters, each binaural filter being configured to produce a sound whose source position is able to be perceived as separate from the actual position of one of said left and/or right speakers, the spatialization module 18 being configured to apply, to each mono audio component delivered by the separating module, a binaural filter previously selected from said plurality of binaural filters, and dedicated to said audio component, producing a sound corresponding to said audio component, the source position of which is associated with said previously selected binaural filter.

According to other advantageous aspects of the invention, the audio system comprises one or more of the following features, considered alone or according to all technically possible combinations:

the separating module comprises:
a first determining tool configured to determine a mono-extraction filter from the right and left input signals;
a second determining tool configured to determine a stereo-filter from the right and left input signals; and
a filtering tool configured to determine said at least four mono audio components by applying the mono-extraction filter and the stereo-extraction filter to the right and left input signals;

each binaural filter is able to deliver, from the mono audio component to which it is dedicated, two outputs comprising a left output able to be conveyed to the set of L left speaker(s), and a right output able to be conveyed to the set of R right speaker(s);

the sound spatialization module comprises a tool for selecting, within the plurality of binaural filters, a binaural filter to be associated with each audio component, the selection tool being able to be connected to at least one of the elements belonging to the group comprising:
a set of alert generator(s) outside the audio system,
a relative position sensor of the set of R right speaker(s) and the position of the set of L left speaker(s) relative to the position of the head of the user on the headrest,
a cursor for manual selection of sound playback mode(s),
the selection tool being able to dynamically modify the selection of the binaural filter as a function of an information item received from said set of alert generator(s), said sensor or said cursor;

the set of alert generator(s) comprises at least one mobile obstacle detector, the selection tool being able to dynamically govern the selection of a binaural filter as a function of the position of the mobile obstacle;

the electronic chain further comprises a module for reconstituting low frequencies, the outputs of which are connected to the inputs of the separating module;

the electronic chain further comprises an equalization module, the outputs of which can be connected to the input of the low-frequency reconstitution module, the equalization module being configured to apply prior equalization processing to the right input signal and to the left input signal, the resulting right equalized signal and the resulting left equalized signal respectively being able to substantially correspond to a predetermined right reference near-field listening curve and a predetermined left reference near-field listening curve;

the electronic chain further comprises a sound widening module, the input of which can be connected to the output of the sound spatialization module, the sound widening module being able to apply a predetermined reverberation processing;

the predetermined reverberation processing varies as a function of the source position of the input signal of the widening module;

the electronic chain further comprises a module for adjusting sound intensity, the input of which can be connected to the output of the widening module, the sound intensity adjusting module being configured, for a given listening volume, to apply a psychoacoustic equalization to its input signals that is able to make all of the frequencies of each input signal perceptible with the same sound intensity.

The invention also relates to a seat headrest designed to be coupled to a backrest of a seat, the headrest being equipped with an audio system as defined above, the speaker(s) being integrated into the headrest.

The invention also relates to a passenger transport vehicle, in particular a motor vehicle, the transport vehicle comprising one or several seats, at least one seat including a headrest as defined above.

The invention also relates to an audio processing method, implemented by an audio system for a seat headrest comprising a set of R right speaker(s), a set of L speaker(s), and a control unit comprising an electronic chain configured to emit a sound signal from at least one pair of input signals comprising a right input signal and a left input signal for reproducing sounds via a pair of channels comprising a right channel and a left channel, the respective ends of which are the right set of R speaker(s) and the left set of L speaker(s), R and L being integers greater than or equal to one, each speaker being configured so as to be integrated into the headrest, the method comprising:

a separation delivering, from the input signal, four mono audio components, preferably, two left mono audio components and two right mono audio components, a sound spatialization applying a binaural filter to each component, selected beforehand from a plurality of binaural filters, each binaural filter being configured to produce a sound whose source position is able to be perceived as separate from the actual position of one of said left and/or right speakers, the selected and applied binaural filter being dedicated to said audio component, and producing a sound corresponding to said audio component, the source position of which is associated with said binaural filter.

The invention also relates to a computer-readable medium storing a program having software instructions which, when executed by a computer, implement such an audio processing method.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

In the rest of the description, the expression "substantially equal to" designates a relationship of equality to within plus or minus 10%, preferably to within plus or minus 5%.

Hereinafter, "integrated into the headrest" in particular refers to the first case where the set of R right speaker(s) and the set of L left speaker(s) are placed inside or outside a central part of the headrest substantially parallel to the backrest of the seat, the height of which is adjustable, and on which the head of the passenger can rest, the set of R right speaker(s) being placed to the right of the position of the passenger's head, the set of L left speaker(s) being placed to the left of the position of the passenger(s) head.

According to a second case, the headrest also comprises two lateral extensions (also called lateral flanks or lateral flanges) located on either side of the central part and extending from the latter, the lateral extensions being stationary or movable between a deployed position aligned with the central part and a lowered position in which a lateral extension is brought closer to the head of the passenger to a maximally lowered position where a lateral extension is perpendicular to the central part. According to this second case, a possible integration of the speakers consists of placing the set of R speaker(s) inside or outside the right lateral extension and the set of L left speaker(s) inside or outside the left lateral extension.

Figure 1:
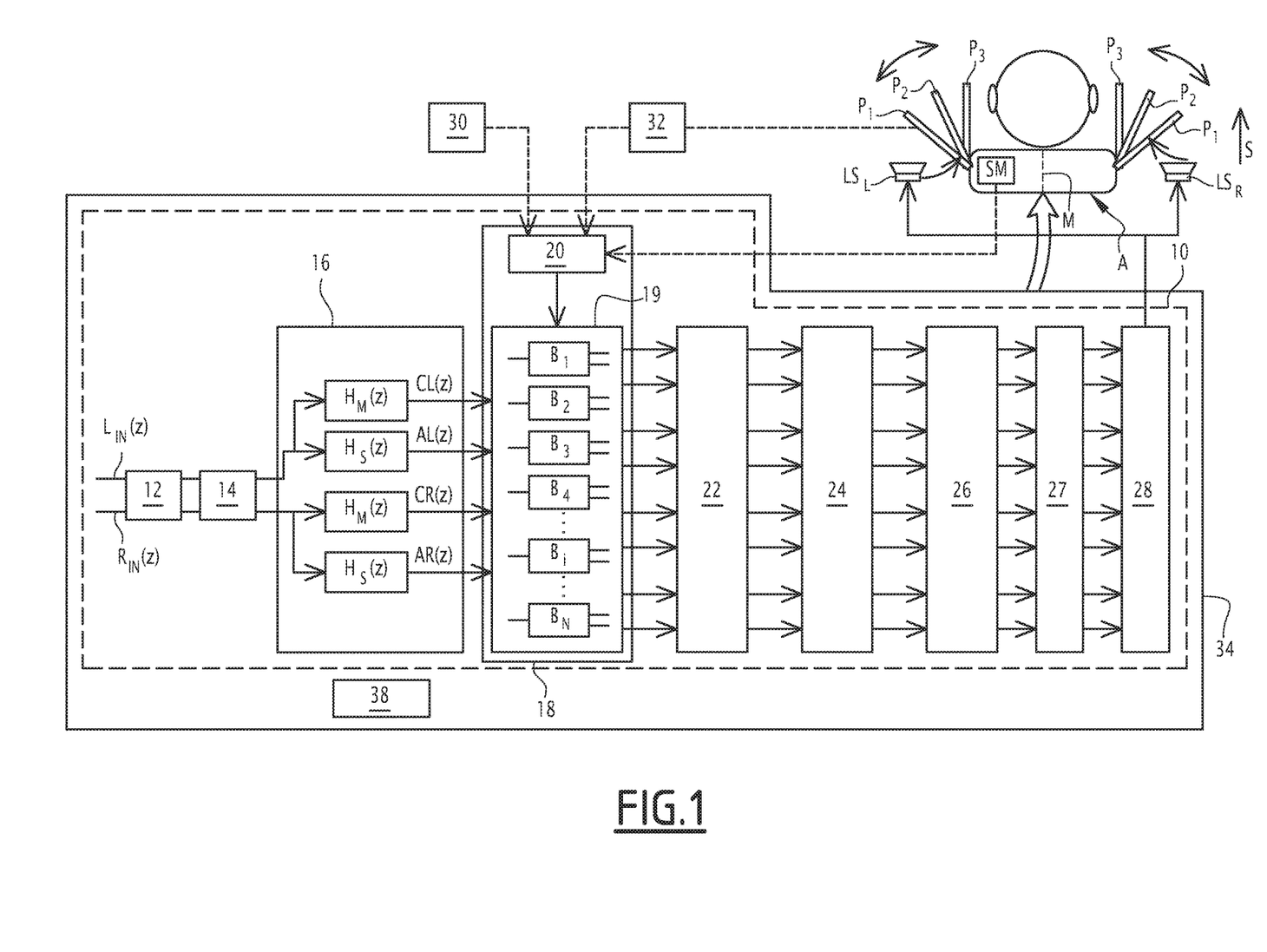
FIG. 1 is a schematic view of the audio system.

In FIG. 1, an audio system according to an embodiment of the present invention is configured to be integrated into the headrest A of a vehicle seat. Such a headrest A comprises a central part able to be secured to the seat and two lateral extensions, respectively left and right, secured on either side of the central part.

The headrest comprises at least two speakers divided into a set of R right speaker(s) and a set of L left speaker(s) distributed on either side of a median line M of the headrest parallel to the movement direction S of the vehicle.

In the example of FIG. 1, for simplicity, R=L=1, and the audio system then comprises a single left speaker $LS_L$ and a single right speaker $LS_R$ and is designed to emit a sound signal from at least one pair of input signals comprising a right input signal $R_{IN}(z)$ and a left input signal $L_{IN}(z)$ for reproducing sounds via a pair of channels comprising a right channel and a left channel, the respective ends of which are the right speaker $LS_R$ and the left speaker $LS_L$.

To that end, the audio system for a seat headrest comprises a configured electronic chain 10, which, according to the embodiment of FIG. 1, comprises at least nine modules able to carry out separate electronic processing operations.

Optionally, such an electronic chain 10 first comprises an equalization module 12, the inputs of which are able to be supplied by the right $R_{IN}(z)$ and left $L_{IN}(z)$ input signals and the outputs of which can be connected to the input of an optional low frequency reconstitution module 14.

The electronic chain 10 further primarily comprises a separating module 16 configured to obtain, from the right input signal $R_{IN}$ and the left input signal $L_{IN}$, at least four mono audio components CL, AL, CR and AR. As an example, the separating module 16 is configured to obtain two mono audio components CR, AR from the right input signal $R_{IN}$, and to obtain two left mono audio components CL, AL from the left input signal $L_{IN}$. In a variant, the separating module 16 is configured to obtain five or more mono audio components from the right input signal $R_{IN}$, and the left input signal $L_{IN}$.

At the output of the separating module 16, the electronic chain 10 comprises a sound spatialization module 18 comprising a plurality 19 of binaural filters $B_1, B_2, \ldots B_N$, each binaural filter being configured to produce a sound whose source position is able to be perceived as separate from the actual position of one of said left and/or right speakers, the spatialization module 18 being configured to apply, to each audio component CL, or AL, or CR, or AR delivered by the separating module 16, a binaural filter previously selected from said plurality of binaural filters, and dedicated to said audio component, producing a sound corresponding to said audio component, the source position of which is associated with said previously selected binaural filter.

To that end, according to the example of FIG. 1, such a sound spatialization module 18 further comprises a tool 20 for selecting, within the plurality 19 of binaural filters ($B_1, B_2, \ldots B_N$), the binaural filter to be associated with each mono audio component.

Then, optionally, the electronic chain 10 further comprises a sound widening module 22, the input of which can be connected to the output of the sound spatialization module 18, the sound widening module 22 being able to apply a predetermined reverberation processing.

At the output of the widening module 22, the electronic chain 10 optionally further comprises a module 24 for adjusting configured sound intensity, for a given listening volume, in order to apply a psychoacoustic equalization to its input signal(s) that is able to make all of the frequencies of each input signal perceptible with the same sound intensity.

Then, after the sound intensity adjusting module 24, the electronic chain 10 comprises a module 26 for generating the desired volume by the user, connected, if applicable via an optional limiter 27, to a mixing module 28 of the audio components thus processed all along the electronic chain 10.

Such an electronic chain 10 is, according to one exemplary embodiment illustrated by FIG. 1, located in a control unit 34 placed inside the headrest A.

Each of the modules primarily or optionally making up such an electronic chain 10 of the audio system is described in detail hereinafter.

First, the optional equalization module 12 is configured to apply prior equalization processing to the right input signal and to the left input signal, the resulting right equalized signal $R_{IN}$ and the resulting left equalized signal $L_{IN}$ respectively being able to substantially correspond to a predetermined right reference near-field listening curve and a predetermined left reference near-field listening curve.

In particular, such a predetermined right or left reference near-field listening curve is for example able, compared to far-field listening, to attenuate the high frequencies in order to avoid an "aggressive" sound rendering in the near field that may make listening by the user tiresome and/or unpleasant. In practice, the predetermined right or left near-field listening curve is adaptable to meet the listening expectations proposed by the builder, the operator of the vehicle or the passenger user and to adapt to particularities specific to the integration of the speakers into a headrest. It is therefore possible that depending on the case, an amplification of the high frequencies may be applied in place of an attenuation according to the preceding example.

According to one particular aspect, the predetermined right and left reference near-field listening curves are identical.

Indeed, the integration of one or several speaker(s) into a headrest results in modifying the frequency response of the speaker(s). Additionally, the frequency response of a speaker cannot be flat and/or may be very limited in terms of low frequency due to its reduced dimensions in order to allow it to be integrated within a headrest.

The equalization module 12 aims to improve the frequency response of the speaker(s) integrated within a headrest by causing it to correspond at most to a reference frequency response curve adapted to a near-field listening application. In other words, the equalization module is configured to modify the right $R_{IN}$ and left $L_{IN}$ input signals so as to cause them to respectively converge toward a reference frequency response curve adapted to the performance of the speaker(s) with which they are associated while taking account of the integration of this or these speaker(s) within the headrest. The equalization provided by the equalization module 12 is therefore able to best adapt to the working frequency range of the speaker(s) integrated into the headrest.

The optional low frequency reconstitution module 14, the inputs of which are connected to the equalization module 12 and the outputs of which are connected to the inputs of the separating module 16, is configured to add additional processing to a low-frequency part of the signals coming from the equalization module.

More specifically, as previously indicated, the speaker(s) integrated into a headrest are generally small, compared with stationary speakers distributed in a vehicle passenger compartment, and because of this small size, have a limited low-frequency response with frequencies generally greater than 150 Hz.

The equalization done beforehand by the equalization module 12 makes it possible to compensate only up to a certain point for such a loss of low-frequency sound playback quality, since the equalization module applies a compromise between the increased rendering of the low frequencies and the increase in the associated distortions.

The optional low frequency reconstitution module 14 seeks to improve the rendering of low frequencies differently by stimulating the psychoacoustic perception of these low frequencies owing to the missing fundamental effect. More specifically, owing to the optional low frequency reconstitution module 14, the frequency that can not be physically reproduced by the speaker can be perceived psychoacoustically, the optional low frequency reconstitution module 14 being able to create the corresponding harmonics in the working frequency range of the speaker(s).

To that end, the optional low frequency reconstitution module 14 for example uses a low frequency reconstitution method like that described in patent EP 2,113,913 B1. The method disclosed herein may be specifically applied to the case of the integration of speaker(s) within a headrest to improve the low-frequency playback performance thereof in order to create private audio zones for different occupants of a same vehicle.

Thus, owing to the prior processing done by the optional low frequency reconstitution module 14, the playback of low frequencies for the user whose head is resting on the headrest does not require any contribution by another speaker outside the headrest audio system.

Indeed, the transformation module of the audio system makes it possible, at the output of the audio system, to play back low frequencies that would be lost without such an optional low frequency reconstitution module 14.

In other words, the user manages, owing to the transformation module, to virtually perceive the low frequencies that are, without this transformation module, attenuated or even lost due to the size and integration of the speakers into the headrest.

Thus, while guaranteeing a quality of the audio playback of low frequencies, the audio system is autonomous and makes it possible to do away with the installation of speaker(s) in the passenger compartment of the vehicle, which in particular makes it possible to free up space therein, or even to lighten the vehicle.

The combination of the optional equalization 12 and low frequency reconstitution 14 modules therefore makes it possible to considerably improve the quality in terms of low frequency of the sound signals that will be played back by the speakers integrated within a headrest, prior to the processing able to be done by the separating module 16 and by the sound spatialization module 18 that follow it in the electronic chain 10 and that in turn make it possible to create private audio zone(s) as such.

According to one particular aspect, the separating module 16 comprises:
- a first determining tool (not shown) configured to determine a mono-extraction filter HM from the right and left input signals RIN, LIN;
- a second determining tool (not shown) configured to determine a stereo-extraction filter HS from the right and left input signals RIN, LIN; and
- a filtering tool (not shown) configured to determine said at least four mono audio components CL, AL, CR, AR by applying the mono-extraction filter HM and the stereo-extraction filter HS to the right RIN and left LIN input signals.

"Mono-extraction filter" HM for example refers to a filter able to extract, from the input signal of the separating module 16 corresponding to the right input signal $R_{IN}$ (in particular after the preprocessing operations of the optional equalization 12 and low frequency reconstitution 14 modules), the first right mono audio components CR shared by the two right and left input signals $R_{IN}$, $L_{IN}$, and to extract, from the input signal of the separating module 16 corresponding to the left input signal $L_{IN}$, the first left mono audio component CL shared by the two right $R_{IN}$ and left $L_{IN}$ input signals.

"Stereo-extraction filter" HS for example refers to a filter able to extract, from the right input signal $R_{IN}$, the second right mono audio component AR weakly correlated with, or even absent from, the left input signal $L_{IN}$ (that is to say, the correlation between the right mono component AR and the left input signal $L_{IN}$ being below a predetermined correlation threshold, or even nil), and to extract, from the left input signal $L_{IN}$, the second left mono audio component AL weakly correlated with, or even absent from, the right input signal $R_{IN}$ (that is to say, the correlation between the left mono component AL and the right input signal $R_{IN}$ being below a predetermined correlation threshold, or even nil).

More specifically, in order to determine the mono-extraction filter HM, the first determining tool is able to measure the correlation between the two signals respectively corresponding to the right $R_{IN}$ and left $L_{IN}$ input signals, and to determine the stereo-extraction filter $H_S$, the second determining tool is able to measure the coherence, for example the magnitude-squared coherence (MSC) or the long-term coherence (time average) between the two signals respectively corresponding to the right $R_{IN}$ and left $L_{IN}$ input signals.

In a variant, any other known method for determining a mono-extraction filter or for determining a stereo-extraction filter is applicable.

As an alternative, as previously indicated, the separating module 16 is configured to obtain five or more mono audio components from the right input signal $R_{IN}$, and the left input signal $L_{IN}$.

The mono audio components are next delivered by the separating module 16 at the input of the aforementioned sound spatialization module 18.

According to one optional aspect that is not shown, each mono audio component is amplified or attenuated beforehand between the output of the separating module 16 and the input of the sound spatialization module 18. In other words, a gain is applied to modify the relative amplitude of the various components.

The creation of private audio zone(s) takes account of the fact that if the right $R_{IN}$ and left $L_{IN}$ input signals were played back directly (that is to say, without using the specific modules of the disclosed embodiment) by the speakers of the headrest, they would be perceived by a passenger user as coming from the actual position of the speakers, that is to say, behind his head resting on the headrest and in immediate proximity.

The spatialization module 18 seeks to modify the sound perception of the user by producing a sound perception whereof the source position is perceived as being distant from the actual position of the speaker(s) so as to create a private audio emitting zone all around the head of the passenger user and to broaden this zone. In other words, the sound spatialization module 18 allows a passenger user to perceive a predetermined plurality of N virtual sound source positions, for example distributed at 360° all the way around his head and placed at a greater distance relative to the actual position of the speaker(s) integrated within the headrest.

To that end, the spatialization module 18 comprises a plurality 19 of binaural filters counting as many binaural filters $B_1$, $B_2$, ... $B_N$ as N virtual sound source positions distributed, for example at 360°, all around the theoretical position of the head of a passenger user on the headrest, namely for example at the center of the headrest.

According to one particular aspect, each binaural filter $B_1$, $B_2$, ... $B_N$ is able to apply two right and left head-related transfer functions HRTF_R and HRTF_L each associated with a respective virtual incidence angle $\theta_1, \theta_2, \ldots, \theta_N$ of the sound wave relative to a predetermined reference axis.

Each head-related transfer function HRTF is obtained beforehand by measuring the acoustic path between the two ears of a passenger user whose head is ideally placed in the theoretical position at the center of the headrest and a sound source actually placed along the direction of incidence $\theta_i$ with $1 \leq i \leq N$.

According to one particular aspect, a smoothing of the HFTF functions is carried out so that the spatialization done by the spatialization module 18 works on average for each user.

Figure 2:
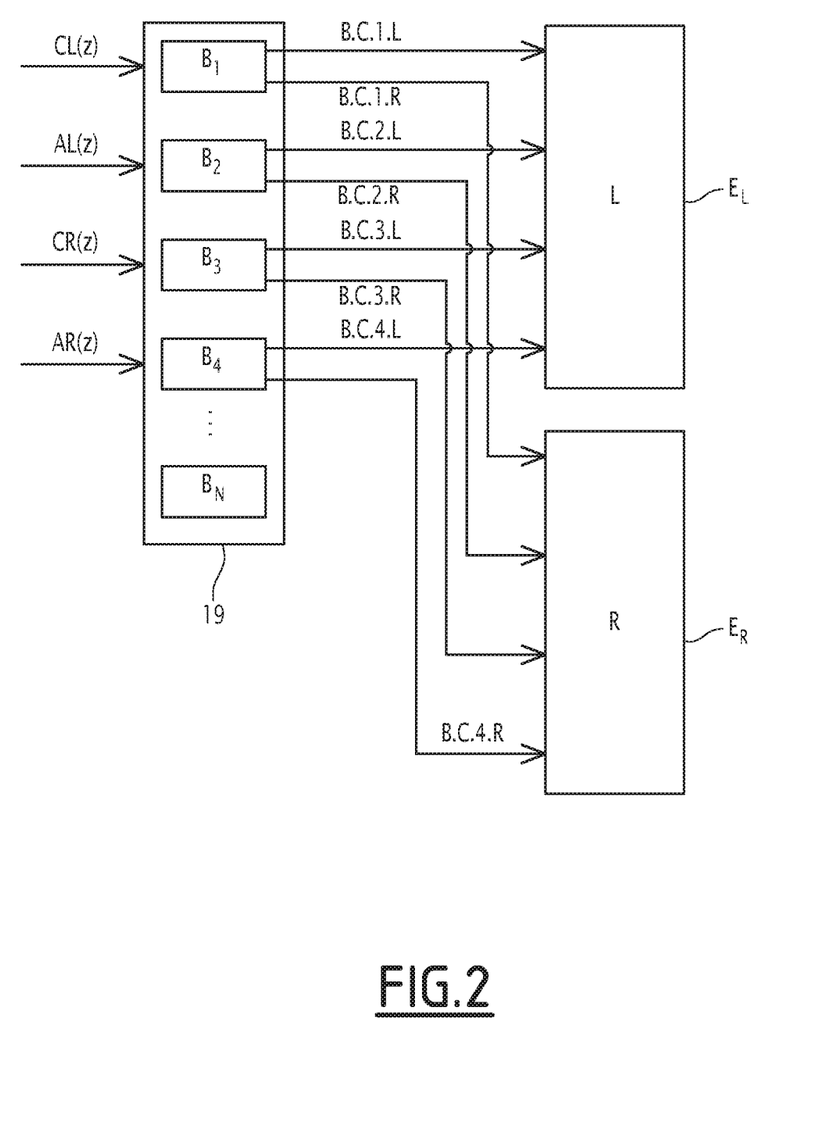
FIG. 2 is a schematic illustration of one embodiment of the sound spatialization module according to the invention.

In other words, as illustrated by the example of FIG. 2, each binaural filter is able to deliver, from the mono audio component to which it is dedicated, two outputs comprising a left output able to be conveyed to the set $E_L$ of L left speaker(s), and a right output able to be conveyed to the set $E_R$ of R right speaker(s).

More specifically, according to the example of FIG. 2, the binaural filter $B_1$ is dedicated to the mono audio component CL and delivers two outputs comprising a left output B.C.1.L able to be conveyed to the set of L left speaker(s), and a right output B.C.1.R able to be conveyed to the set of R right speaker(s), such that: B.C.1.L=CL*HRTF_L($\theta_1$) and B.C.1.R=CL*HRTF_R($\theta_1$).

Likewise, according to the example of FIG. 2, the binaural filter $B_2$ is dedicated to the mono audio component AL and delivers two outputs comprising a left output B.C.2.L able to be conveyed to the set of L left speaker(s), and a right output B.C.2.R able to be conveyed to the set of R right speaker(s), such that: B.C.2.L=AL*HRTF_L($\theta_2$) and B.C.2.R=AL*HRTF_R($\theta_2$).

Likewise, according to the example of FIG. 2, the binaural filter $B_3$ is dedicated to the mono audio component CR and delivers two outputs comprising a left output B.C.3.L able to be conveyed to the set of L left speaker(s), and a right output B.C.3.R able to be conveyed to the set of R right speaker(s), such that: B.C.3.L=CR*HRTF_L($\theta_3$) and B.C.3.R=CR*HRTF_R($\theta_3$).

Likewise, according to the example of FIG. 2, the binaural filter $B_4$ is dedicated to the mono audio component AR and delivers two outputs comprising a left output B.C.4.L able to be conveyed to the set of L left speaker(s), and a right output B.C.4.R able to be conveyed to the set of R right speaker(s), such that: B.C.4.L=AR*HRTF_L($\theta_4$) and B.C.4.R=AR*HRTF_R($\theta_4$).

The signals corresponding to the right outputs B.C.1.R, B.C.2.R, B.C.3.R, B.C.4.R are able to be supplemented by the mixing module 28 to next be played back by the set of R right speaker(s), and the signals corresponding to the left outputs B.C.1.L, B.C.2.L, B.C.3.L, B.C.4.L are able to be supplemented by the mixing module 28 to next be played back by the set of L left speaker(s).

According to one particular aspect, the binaural filters B1, B2, B3, B4, previously respectively selected bijectively for each left and right mono audio component CL, AL, CR, AR, are for example all identical, all different or comprise two or even three different/identical binaural filters.

As an optional addition, as illustrated in FIG. 1, the sound spatialization module 18 comprises a tool 20 for selecting, within the plurality 19 of binaural filters $B_1, B_2, \ldots, B_N$, a binaural filter to be associated with each audio component, the selection tool 20 being able to be connected to at least one of the elements belonging to the group comprising:

- a set 30 of alert generator(s) outside the audio system,
- a relative position sensor 32 of the set of R right speaker(s) and the position of the set of L left speaker(s) relative to the position of the head of the user on the headrest,
- a cursor for manual selection SM of sound playback mode(s), the selection tool 20 being able to dynamically modify the selection of the binaural filter to be associated with a mono audio component as a function of an information item received from the set 30 of alert generator(s), the sensor 32 or said cursor SM.

"Cursor" refers to any interface means allowing a user of a headrest according to embodiments of the present invention to enter the desired sound playback mode(s), in particular as a function of the type of sound to be played back.

In other words, the selection tool 20 makes it possible to modify the delivered sound dynamically, and if applicable, as a function of the listening context of the passenger.

For example, when the headrest comprises two lateral extensions (movable to several positions, between a deployed position (not shown) aligned with the central part and the lowered positions $P_1$, $P_2$, illustrated by FIG. 1, in which a lateral extension is brought closer to the head of the passenger to a maximally lowered position $P_3$, where a lateral extension is perpendicular to the central part, the sensor 32 of the relative position of the set of R right speaker(s) and the position of the set of L left speaker(s) relative to the position of the head of the user on the headrest is able to transmit an information item representative of this position to the selection tool 20 in order to adapt the binaural filter selection so that the sound playback mode desired by the passenger is obtained irrespective of the position of the lateral extensions.

To that end, the sound spatialization module 18 is for example associated with a database stored within a memory 38, for example located in the control unit 34 of the radio system, which the selection tool 20 can access in real time, the database comprising a match table, obtained during a prior adjustment phase, associating, with each sound playback mode, a position of the lateral extensions, a mono audio component to be processed, and the binaural filter dedicated to said mono audio component to be processed.

According to one particular aspect, the set of alert generator(s) 30 comprises at least one mobile obstacle detector, the selection tool 20 being able to dynamically govern the selection of a binaural filter as a function of the position of the mobile obstacle, which makes it possible to create a dynamic sound perception as a function of the position of the mobile obstacle.

In other words, according to this aspect, if a vehicle separate from that in which the passenger is placed passes, the obstacle detector for example determines, for example at a time t1, a first position V1 of the separate vehicle that initiates the passing, located behind the vehicle where the passenger, whose head is resting on the headrest comprising the audio system, is located; the selection tool 20 is then able to select, at the time t1, a set of binaural filter(s) able to play back a sound for the passenger whereof the source is perceived behind the head of the passenger.

At a time t2, the obstacle detector determines a second position V2 of the passing vehicle located to the left of the vehicle where the passenger is located; the selection tool 20 is then able to select, at the time t2, a set of binaural filter(s) able to play a sound back for the passenger, the source of which is perceived on the left side of the head of the passenger.

At a time t3, the obstacle detector determines a third position V3 of the passing vehicle located in front of the vehicle where the passenger is located; the selection tool 20 is then able to select, at the time t3, a set of binaural filter(s) able to play back a sound whose source is perceived in front of the head of the passenger.

Likewise, to provide information on the evolution of the space in which the vehicle is moving, it is thus possible to produce a sound alert for which the movement of the virtual source follows the path of a vehicle located in the blind spot of the driver whose head is resting on a headrest according to the illustrated embodiment of the present invention.

The manual selection cursor SM for sound playback mode(s) also allows the user to control the position of the different virtual sound sources (that is to say, the incidence of the perceived sound signal), the manual choice of a sound playback mode being taken into account directly by the selection tool 20 in order to adapt the selection of a binaural filter to be applied to a given mono audio component. Such a cursor for manual selection SM of sound playback mode(s) offers a customized experience of the audio (i.e., public address) system.

According to another specific aspect, not shown, the selection tool 20 is also able, according to a first variant, to modify the spatialization as a function of the type of audio source(s) (or sound source(s)), for example a first type of sound source is associated with a multimedia application for listening to music, a radio show, the sound of a video, etc., a second type of sound source is associated with a telephone application, a third type of sound sources associated with the vehicle as such, in particular by means of the set of outside alert generator(s) 30.

For example, in order to create a musical surround sound environment, the directions of arrival of the so-called center mono audio components can be 30° and −30°, and those of the so-called ambient mono audio components can be 100° and −100°.

In addition or as an alternative, the audio signals generated by an advanced driver assistance system (ADAS) and guiding audio signals are also able to be spatialized with predetermined directions of arrival (that is to say, incidence from virtual source position). These directions of arrival can be different for each type of signal. For example, the ADAS signals can come from 30°, while the guide signals can come from −50° and telephone ringtones from −60°.

According to a second variant, not shown, the electronic chain 10 is duplicated, for each type of sound to be played back, for example within a same control unit 34. In other words, according to this second variant, several electronic chains 10, each dedicated to a particular type of sound, are parallelized at the input of the set of R right speaker(s) and the set of L left speaker(s), which for example make it possible, if applicable, to superimpose, on the music being played back, an alert emitted by the vehicle, such as traffic information generated by GPS or by navigating personnel of the vehicle or a personal calendar reminder entered in a mobile telephone calendar, with virtually separate source positions.

According to the example of FIG. 1, the outputs of the sound spatialization module 18 are optionally connected to a sound widening module 22 able to apply predetermined reverberation processing.

Indeed, directly after spatialization, the outgoing sound able to be delivered by the speakers of the headrest will be perceived as being emitted by virtual sources, granted located in positions different from the actual position of the speakers, but still virtually positioned inside the head of the passenger user. In order to increase the perceived distance between these virtual sources and the head of the passenger, reverberation processing is able to be carried out in the electronic chain 10 of an audio system for a headrest according to the embodiment illustrated by FIG. 1. In particular, the reverberation done, while remaining imperceptible by a human ear, makes it possible to "externalize" the position of the virtual sources such that the perceived sound is no longer associated with a sound playback coming from inside the head.

According to one particular aspect of the present invention, the predetermined reverberation processing varies as a function of the source position of the input signal of the widening module. As an alternative, any other reverberation processing used in other audio applications may also be implemented within the electronic chain 10 of the audio system for an autonomous headrest, and more specifically at the output of the spatialization module 18.

As previously indicated, according to the embodiment illustrated by FIG. 1, at the output of the widening module 22, the electronic chain 10 optionally further comprises a module 24 for adjusting configured sound intensity, for a given listening volume (i.e., sound volume), in order to apply a psychoacoustic equalization to its input signal(s) that is able to make all of the frequencies of each input signal perceptible with the same sound intensity.

More specifically, sound intensity refers to the subjective perception of the sound pressure. Indeed, the perception of the sound level by the human ear depends on the frequency content of the signals received and their acoustic pressure. For example, for a low listening volume, human hearing becomes less sensitive to low and high frequencies. To offset such a loss of sensitivity to certain frequencies in the presence of a predetermined sound volume value, the sound intensity adjusting module 24 added to the electronic chain 10 of the headrest audio system applies a different gain from one frequency to another so as to make all of the frequencies perceptible with the same sound intensity.

In the exemplary embodiment of FIG. 1, after the sound intensity adjusting module 24, the electronic chain 10 comprises a module 26 for generating the desired volume by the user applying a gain in the time domain, in other words, applying a same gain to all of the sound frequencies.

In the electronic chain 10, the position of the optional modules 24 for adjusting sound intensity and 26 for generating the desired volume by the user are interchangeable.

The intensity adjusting module 24, like the module 26 for generating the volume desired by the user, are, according to one particular aspect, both governed synchronously, by the desired sound volume adjustment done manually by the user in particular via his smartphone connecting by wired or wireless connection with the headrest or via a button dedicated to adjusting the sound volume placed directly on the headrest. In other words, each volume level change requested by the user triggers both an update of the parameters of the intensity adjusting module 24, and of the module 26 for generating the volume desired by the user.

After the intensity adjusting module 24 and the module 26 for generating the volume desired by the user, the electronic chain 10 comprises a limiter 27 able to prevent clipping distortions that is in turn connected to a mixing module 28 of the audio components thus processed all along the chain 10.

Figure 3:
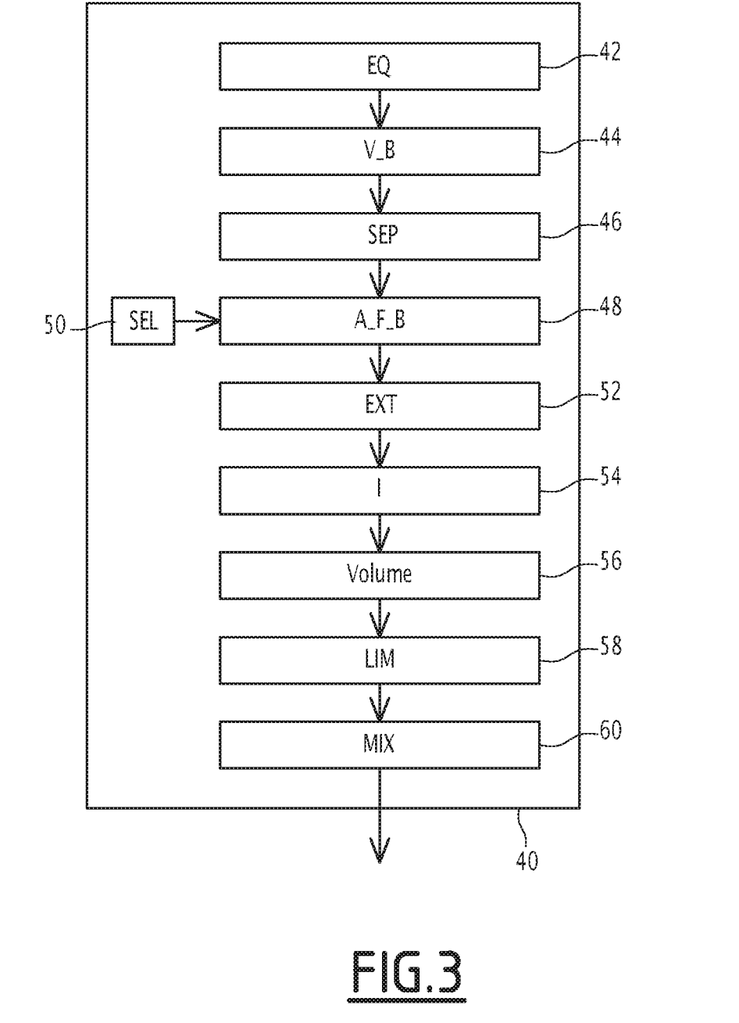
FIG. 3 is a flowchart of an audio processing method according to an embodiment of the present invention.

One non-limiting exemplary operation of the audio system illustrated by FIG. 1 will now be explained using FIG. 3, showing an example flowchart of an audio processing method 40.

During a first optional step 42, the audio system implements, via the equalization module 12, an equalization EQ of the right $R_{IN}$ and left $L_{IN}$ input signals.

Then, according to a second optional step 44, the audio system creates virtually V_B, in the working frequency range of the speaker(s), via the low frequency reconstituting module 14, the harmonics corresponding to the frequency that cannot be physically reproduced by the speaker so that they are perceived psychoacoustically.

Next, according to a step 46, the audio system carries out, via the separating module, a separation SEP delivering, from the right input signal $R_{IN}$ and the left input signal $L_{IN}$, at least four audio components, for example the aforementioned left and right mono audio components CL, AL, CR, AR.

Then, according to a step 48, the audio system carries out, via the spatialization module 18, a sound spatialization by applying to each mono audio component, for example CL, AL, CR, AR, a binaural filter, selected beforehand during a selection SEL step 50 from a plurality of binaural filters ($B_1$, $B_2$, ... $B_N$), each binaural filter being configured to produce a sound whose source position is able to be perceived as separate from the actual position of one of said left and/or right speakers, the selected and applied binaural filter being dedicated to said audio component, and producing a sound corresponding to said audio component, the source position of which is associated with said binaural filter.

Next, during an optional step 52, the audio system carries out, via the sound widening module 22, an externalization EXT of the position of the virtual sources such that the perceived sound is no longer associated with a sound playback coming from inside the head.

Then, according to an optional step 54, the audio system carries out, for a given listening volume, via the sound intensity adjusting module 24, an application I of a psychoacoustic equalization able to make all of the frequencies of the input signal(s) of the sound intensity adjusting module 24 perceptible with the same sound intensity.

Next, during an optional step 56, which is interchangeable with the previous optional step 54, the audio system implements, via the module 26 for generating the volume desired by the user, the application of a gain in the time domain.

The optional step 56 is followed by another optional step 58 where the audio system implements, via the limiter 27, a limitation LIM in order to avoid clipping distortions.

Lastly, in step 60, the outputs of the optional limiter 27 able to be conveyed to the set of R right speaker(s) are mixed by addition on the one hand, and the outputs of the optional limiter 27 able to be conveyed to the set of L left speaker(s) are mixed by addition on the other hand.

Thus, with the audio system for a headrest according to embodiments of the invention, it is possible to create private audio zones for different occupants while avoiding wearing headphones or personal earbuds that may cause discomfort for the ears and/or the head.

Furthermore, as an optional addition, the selection tool 20 of the spatialization module 18 makes it possible to provide each occupant with instantaneous information (such as traffic information, personal calendar reminders, etc.) with specific perception effects, if applicable while continuing playback of a multimedia sound signal such as music.

Furthermore, as an optional addition, the particular sequencing of the component modules of the electronic chain 10 results in an optimization of sound playback and makes the headrest audio system fully autonomous, which makes it possible to do away with the installation of speaker(s) in the passenger compartment of the vehicle, and therefore to free up space, or even to lighten the vehicle.

One can thus see that the audio system makes it possible to improve the interaction with the user and then to offer him a better audio experience.

The invention claimed is:

1. An audio system for a seat headrest comprising a set of R right speaker(s), a set of L left speaker(s), and a control unit comprising an electronic chain configured to emit a sound signal from at least one pair of input signals comprising a right input signal and a left input signal for reproducing sounds via a pair of channels comprising a right channel and a left channel, the respective ends of which are the set of R right speaker(s) and the set of L left speaker(s), R and L being integers greater than or equal to one, each speaker being configured so as to be integrated into the headrest, wherein the electronic chain comprises:
  a separating module configured to obtain, from the right input signal and the left input signal, at least four mono audio components, and
  a sound spatialization module comprising a plurality of binaural filters, each binaural filter being configured to produce a sound whose source position is able to be perceived as separate from the actual position of one of said left and/or right speakers, the spatialization module being configured to apply, to each right and left mono audio component delivered by the separating module, a binaural filter previously selected from said plurality of binaural filters, and dedicated to said audio component, producing a sound corresponding to said audio component, the source position of which is associated with said previously selected binaural filter.

2. The audio system according to claim 1, wherein the separating module comprises:
  a first determining tool configured to determine a mono-extraction filter from the right and left input signals;
  a second determining tool configured to determine a stereo-filter from the right and left input signals; and
  a filtering tool configured to determine said at least four mono audio components by applying the mono-extraction filter and the stereo-extraction filter to the right and left input signals.

3. The audio system according to claim 1, wherein each binaural filter is able to deliver, from the mono audio component to which it is dedicated, two outputs comprising a left output able to be conveyed to the set of L left speaker(s), and a right output able to be conveyed to the set of R right speaker(s).

4. The audio system according to claim 1, wherein the sound spatialization module comprises a tool for selecting, within the plurality of binaural filters, a binaural filter to be associated with each audio component, the selection tool being able to be connected to at least one element belonging to the group comprising:
  a set of alert generator(s) outside the audio system,
  a relative position sensor of the set of R right speaker(s) and the position of the set of L left speaker(s) relative to the position of the head of the user on the headrest, and
  a cursor for manual selection of sound playback mode(s), the selection tool being able to dynamically modify the selection of the binaural filter as a function of an information item received from said set of alert generator(s), said sensor, or said cursor.

5. The audio system according to claim 4, wherein the set of alert generator(s) comprises at least one mobile obstacle detector, the selection tool being able to dynamically govern the selection of a binaural filter as a function of the position of the mobile obstacle.

6. The audio system according to claim 1, wherein the electronic chain further comprises a module for reconstituting low frequencies, the outputs of which are connected to the inputs of the separating module.

7. The audio system according to claim 6, wherein the electronic chain further comprises an equalization module, the outputs of which can be connected to the input of the low-frequency reconstitution module, the equalization module being configured to apply prior equalization processing to the right input signal and to the left input signal, the resulting right equalized signal and the resulting left equalized signal respectively being able to substantially correspond to a predetermined right reference near-field listening curve and a predetermined left reference near-field listening curve.

8. The audio system according to claim 1, wherein the electronic chain further comprises a sound widening module, the input of which can be connected to the output of the sound spatialization module, the sound widening module being able to apply a predetermined reverberation processing.

9. The audio system according to claim 8, wherein the predetermined reverberation processing varies as a function of the source position of the input signal of the widening module.

10. The audio system according to claim 8, wherein the electronic chain further comprises a module for adjusting sound intensity, the input of which can be connected to the output of the widening module, the sound intensity adjusting module being configured, for a given listening volume, to apply a psychoacoustic equalization to its input signals that is able to make all of the frequencies of each input signal perceptible with the same sound intensity.

11. A seat headrest designed to be coupled to a backrest of a seat, wherein the headrest is equipped with an audio system according to claim 1, the speaker(s) being integrated into the headrest.

12. A passenger transport vehicle, the transport vehicle comprising one or several seats, wherein at least one seat includes a headrest according to claim 11.

13. An audio processing method carried out by an audio system for a seat headrest comprising a set of R right speaker(s), a set of L left speaker(s), and a control unit comprising an electronic chain configured to emit a sound signal from at least one pair of input signals comprising a right input signal and a left input signal for reproducing sounds via a pair of channels comprising a right channel and a left channel, the respective ends of which are the set of R right speaker(s) and the set of L left speaker(s), R and L being integers greater than or equal to one, each speaker being configured so as to be integrated into the headrest, the method comprising:
- a separation delivering, from the right input signal and the left input signal, at least four mono audio components, and
- a sound spatialization applying a binaural filter to each component, selected beforehand from a plurality of binaural filters, each binaural filter being configured to produce a sound whose source position is able to be perceived as separate from the actual position of one of said left and/or right speakers, the selected and applied binaural filter being dedicated to said audio component, and producing a sound corresponding to said audio component, the source position of which is associated with said binaural filter.

14. A non-transitory computer-readable medium storing a program comprising software instructions which, when executed by a computer, carry out an audio processing method according to claim 13.

* * * * *